(12) United States Patent
Samulowitz

(10) Patent No.: US 6,311,951 B1
(45) Date of Patent: Nov. 6, 2001

(54) SOLENOID VALVE

(75) Inventor: Helmut Samulowitz, Stolberg (DE)

(73) Assignee: I.E.M. Industrielle Entwicklung Medizintechnik und Vertriebsgesellschaft mbH (DE)

( * ) Notice: Subject to any disclaimer, the term of this patent is extended or adjusted under 35 U.S.C. 154(b) by 0 days.

(21) Appl. No.: 09/415,318

(22) Filed: Oct. 8, 1999

(30) Foreign Application Priority Data

Oct. 12, 1998 (DE) ............................................... 198 46 841

(51) Int. Cl.[7] .................................................... F16K 31/02
(52) U.S. Cl. ................................. 251/129.16; 251/129.21
(58) Field of Search ........................ 251/129.21, 129.16, 251/129.22

(56) References Cited

U.S. PATENT DOCUMENTS

| | | | |
|---|---|---|---|
| 2,901,623 | * 8/1959 | Wouters | 251/129.06 |
| 2,931,619 | 4/1960 | Anderson | 251/139 |
| 2,947,284 | 8/1960 | Nicholson | 121/38 |
| 3,007,672 | * 11/1961 | Tischler | 251/129.21 |
| 3,586,387 | 6/1971 | Knobel | 251/24 |
| 3,961,644 | * 6/1976 | Eckert | 251/129.21 X |
| 3,982,554 | 9/1976 | Saito et al. | 137/82 |
| 4,196,751 | * 4/1980 | Fischer et al. | 251/129.16 X |
| 4,446,889 | * 5/1984 | Sakakibara et al. | 251/129.16 X |
| 4,585,209 | * 4/1986 | Aine et al. | 251/129.02 |
| 4,793,372 | * 12/1988 | Gauthier et al. | 251/129.21 X |
| 4,889,314 | * 12/1989 | Hashizume et al. | 251/129.16 X |
| 5,040,567 | * 8/1991 | Nestler et al. | 251/129.16 X |
| 5,048,564 | * 9/1991 | Gaiardo | 251/128.16 X |
| 5,158,263 | * 10/1992 | Shimizu et al. | 251/129.21 |
| 5,280,882 | * 1/1994 | Kamiya et al. | 251/129.16 X |
| 5,374,029 | * 12/1994 | Bailey | 251/129.21 X |
| 5,526,837 | * 6/1996 | Eaker | 251/129.21 X |
| 5,681,026 | * 10/1997 | Durand | 251/129.16 |
| 5,797,586 | * 8/1998 | Schulte | 251/129.16 X |

FOREIGN PATENT DOCUMENTS

| | | |
|---|---|---|
| DE-OS 22 11 349 | 9/1973 | (DE) . |
| DE-OS 23 35 460 | 1/1975 | (DE) . |
| DE 24 40 565 C2 | 10/1975 | (DE) . |
| EP 631076-A1 | * 6/1994 | (EP) .................. 251/129.21 |

* cited by examiner

Primary Examiner—Joseph A. Kaufman
Assistant Examiner—John Bastianelli

(57) ABSTRACT

The invention concerns a solenoid valve for the opening and shutting of a channel (16) for a medium, featuring an electromagnet (11) with a soft iron magnetic core (12) and a coil (13) and an armature actuated by them. According to the invention, it is provided that the channel passes through the ferrite core with its feed opening ending at the front side of the ferrite core, that the armature is configured as a sheet metal armature (14) that, on the side of the exit of the channel, is elastically held against the magnetic force and that features a seal (21), on its side facing the channel, which shuts the channel when the sheet metal armature is pulled down.

9 Claims, 3 Drawing Sheets

SOLENOID VALVE

FIELD OF THE INVENTION

The invention concerns a solenoid valve for the opening and shutting of a channel for a medium, the valve features an electromagnet with a soft iron magnetic core and a coil and an armature that can be activated through them. In particular, the invention concerns a valve for a gaseous medium, such as pressurized air, for the actuation of a pressure cuff of a haemo-dynamometer. Therefore, reference is predominantly made to pressurized air without this meaning constituting a limitation. Among other materials, a ferrite core is suited as a soft magnetic core. When reference below is made to a ferrite core, this meaning does not constitute a limitation.

BACKGROUND OF THE INVENTION

For automated haemo-dynamometry, it is required to first pressurize an arm or wrist cuff with air, and to subsequently release the pressure-usually step-by-step. During the individual steps, the pressure within the cuff and heart beat are measured to determine the blood pressure according to the oscillometric method.

For the stepwise release of the pressurized air, usually solenoid valves are used that are connected to the cuff. In particular, in mobile haemo-dynamometric apparatuses that are operated off-line, it is necessary to keep power consumption to a minimum. It is also desirable to minimize the weight of the valve; thus the total weight of the apparatus can be reduced.

Solenoid valves are known that, via an armature and against the force of a spring, actuate a piston contained in a valve body, the free end of which features a seal for sealing the channel. Such valves feature a relatively large moving mass that results in a proportionately large power consumption. Furthermore, these valves are relatively inert. Since the pressurized air in haemo-dynamometers is reduced only in small steps, a quick-responding valve is desirable. The moving armature is often located in the flow channel of the medium to be controlled, which makes the valve susceptive to fouling.

OBJECT OF THE INVENTION

The invention is based on the problem of improving a solenoid valve of the aforementioned type to have reduced weight and to consume little electric power.

SUMMARY OF THE INVENTION

According to the invention, the problem is solved in that the channel passes through the magnetic core with its feed opening ending on the front side of the magnetic core; that the armature is configured as a sheet metal armature that, on the side of the feed opening of the channel, is elastically held against the force of the magnet, and bears, on the side that faces the channel, a seal that shuts the channel in the pulled-down condition of the sheet metal armature. This configuration has the advantage that the armature shuts off the channel without any intermediate elements. The mass of the moving parts is very small, allowing minimum weight and power consumption. Furthermore, the armature is no longer located in the flow of the medium to be controlled, eliminating the risk of functional flaws as a consequence of fouling.

It is particularly useful to configure the mount and the seal to be one piece. The armature sheet metal can be at least partially surrounded by molded plastic to further simplify production.

It is particularly practical if the elastic mount and the seal are constructed in one piece. It can also be provided for the armature sheet metal to be at least partially embedded in plastic by injection molding.

In principle, the type of elastomer to be used is optional, as long as it has the desired and required elastic properties. For example, it could be useful to make the mount and the seal out of silicone. Silicone has the required elasticity for mobile haemo-dynamometers within the desired temperature range of 0° to 50° C.

According to a further embodiment, it is provided that the channel is configured as a nozzle, onto which the soft iron magnetic core can be stacked and held in place. This has the advantage that there is no need for a separate mount for the soft iron magnetic core. In addition, the required power consumption of the valve can be further reduced by possibly providing for a tapered cross-section of the nozzle in the seal area.

Additionally, it could be useful if the nozzle were configured as a projected part of the housing, retaining the valve or the housing of the apparatus into which the valve is installed. In addition, the armature sheet metal could be retained in the housing. Lastly, it is proposed, according to the invention, that the soft iron magnetic core, the coil, and the sheet metal armature be retained in the cover of the housing that retains the valve or in the cover of the apparatus into which the valve is installed. These measures facilitate a particularly simple assembly of the valve, the number of required components being significantly reduced.

It is obvious that the solenoid valve, according to the invention, makes it possible to provide a compact and lightweight valve. Due to its small amount of moving mass, the power consumption is reduced as well. Further, the valve responds quickly due to the low inertia of the sealing element and the armature sheet metal with seal.

BRIEF DESCRIPTION OF THE DRAWINGS

Below, the invention is explained more closely based on the schematic drawing. The figures show.

DETAILED DESCRIPTION OF THE PREFERRED EMBODIMENT

Figure 1:
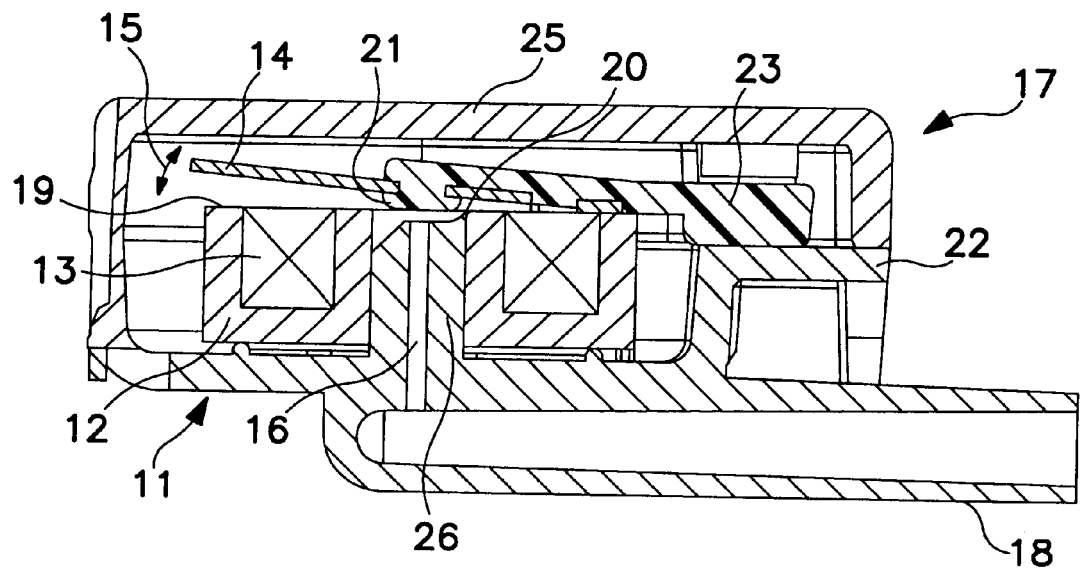
FIG. 1, a cross-sectional view of a valve according to the invention.
Figure 2:
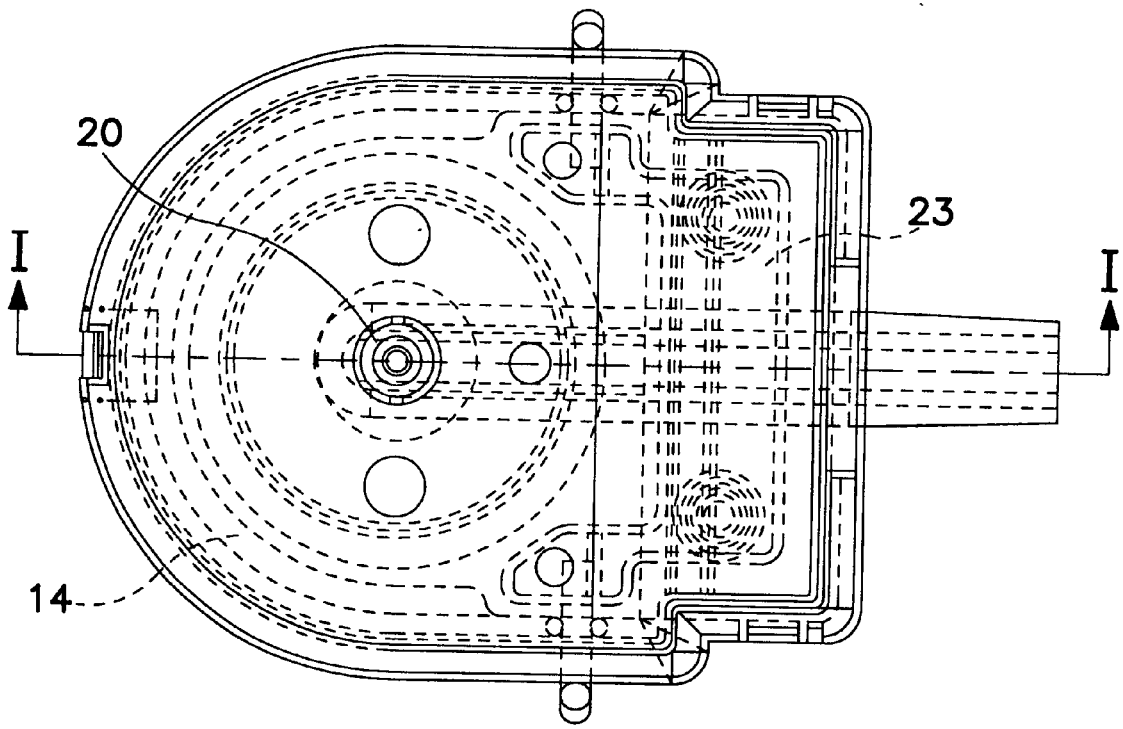
FIG. 2, a plan view of the valve.
Figure 3:
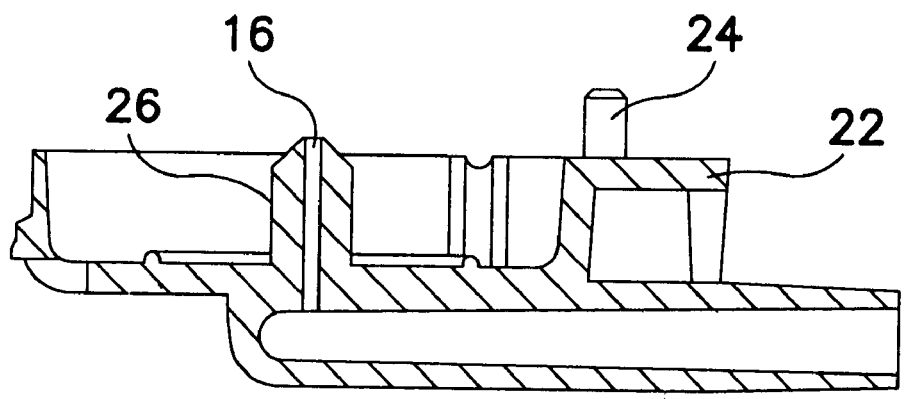
FIG. 3, a cross-sectional view of only the valve housing cover of the valve without the ferrite core, FIG. 4, the bottom part of the housing in perspective view, FIG. 5, a side view of the sheet metal armature with the elastomer retainer, FIG. 6, a bird's eye view according to FIG. 5, and FIG. 7, a perspective view of the sheet metal armature according to FIG. 5.
Figure 4:
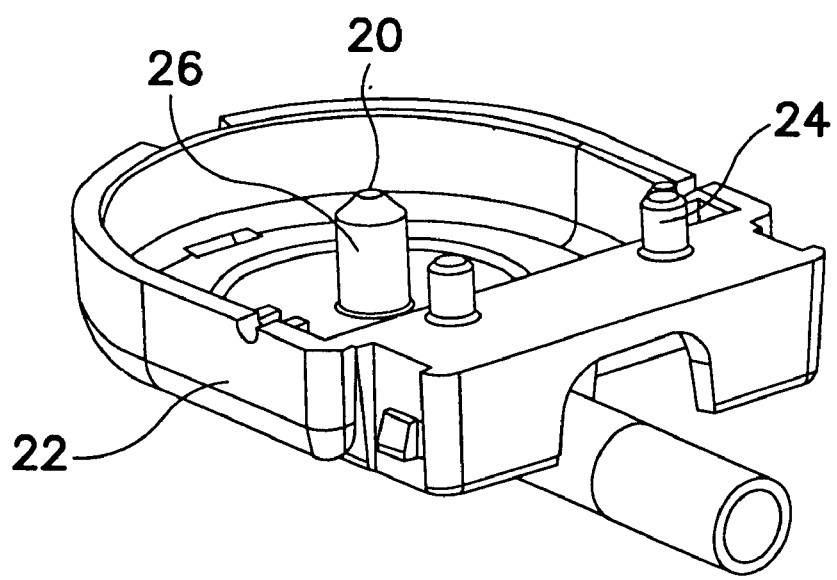

The valve shown in the drawing features an electromagnet 11 with a soft iron magnetic core, e.g. a ferrite core 12, and an electric coil 13. A sheet metal armature 14 is provided that is fastened in a manner that permits it to be tilted in the direction of the double arrow 15. For better clarity, the electrical connections of the coil have not been shown in the drawing.

The ferrite core features a channel 16 for the medium to be controlled, e.g. pressurized air. On the side of the housing 17 that faces away from the sheet metal armature 14, a connecting pipe socket 18 is located by which the valve can be connected to a hose or tube. The channel feeds into the front side 19 of the ferrite core 12 that faces sheet metal armature 14.

The sheet metal armature features an elastic seal 21 on the side facing the feed opening 20 of the channel 16 on the front side 19. The seal fits on top of the opening such that, when sheet metal armature 14 is in its pulled-down position, the channel is closed. In the open position of the valve that is shown in the drawing, the medium is free to pass through the channel.

Coil 13 is configured cylindrically around ferrite core 12 in the usual manner. However, in principle, other contours are also applicable. As soon as a current flows through the coil, the sheet metal armature 14 is pulled down toward the ferrite core, shutting the valve.

The details have been configured such that channel 16 is a nozzle 26 that is configured as a protrusion of the bottom part of housing 22. The ferrite core is stacked upon this protrusion with its port bore, and preferably held there by frictional force. This can be accomplished by the diameter of the protrusion being slightly larger than the diameter of the clear opening of the ferrite core. The protrusion, however, can also feature corresponding protrusions that extend in an axial direction and have matching external dimensions.

The sheet metal piece is retained in the housing by an elastic mount 23 made out of elastic plastic material, e.g. out of silicone. Mount 23 is retained via two pins 24 in the bottom part of housing 22. The details are configured such that housing cover 25 can hold both the ferrite core with coil and the sheet metal armature in their fitting positions.

Figure 5:
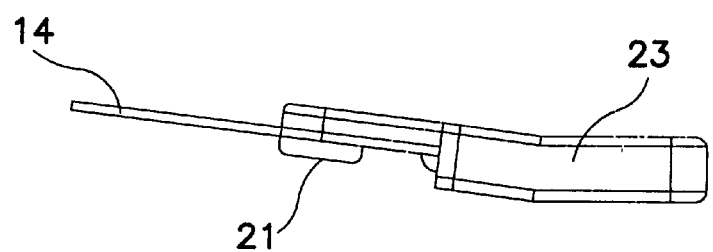
Figure 6:
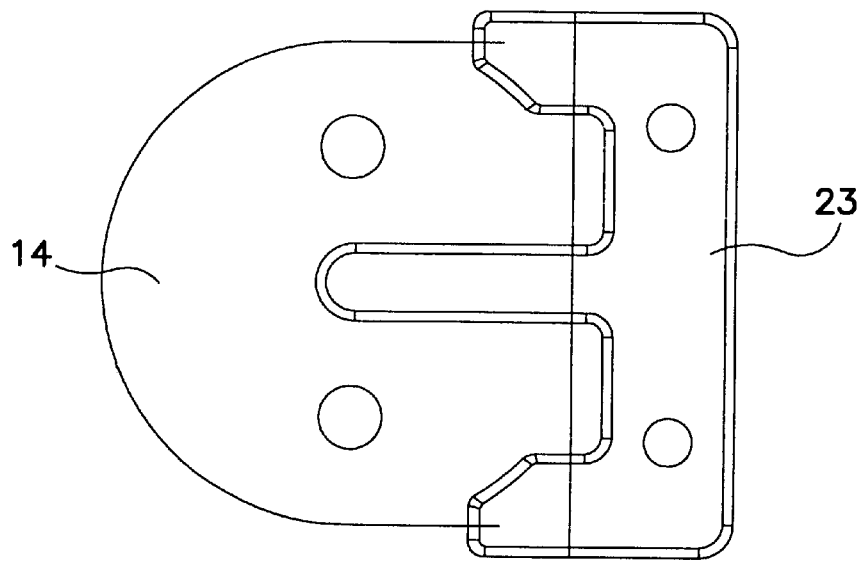
Figure 7:
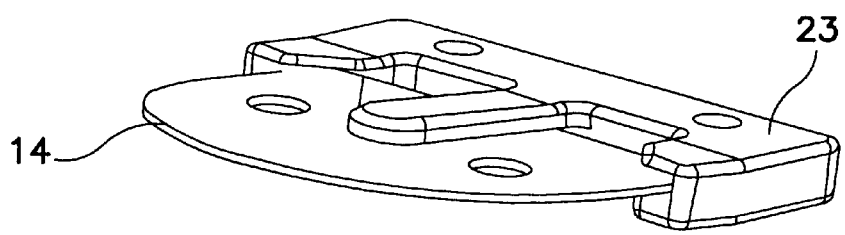

As can be seen in particular in FIGS. 5–7 the plastic mount and seal 21 for the channel form one piece. The sheet metal part of the armature can be retained in a slot in the mount. The elastic plastic mount extends at least to an area of the sheet metal armature that corresponds to the channel of the valve, shutting it in its pulled-down position. The details can be arranged in such a manner that the edge of the sheet metal armature is attached in or on the elastic mount. The elastic mount extends approximately to the channel opening of the valve. This leaves the sheet metal armature free to move, and the section of the mount which forms the seal can shut the channel opening when the magnet is activated.

The mount can be connected with the sheet metal armature in the area that corresponds to the channel opening, e.g. glued or snap-locked into an opening in the sheet metal armature. In this manner, the seal shifts on the sheet metal armature will not prevent the valve from shutting properly.

It can be provided that the elastic mount extends at least up to the channel on the side that faces the magnet and the channel, in this manner forming the seal. It is also possible that, as shown in the drawing, the seal extends to the area of the channel on the side facing away from the magnet, and that it features a protrusion that extends in the direction of channel. The sheet metal armature 14 features an opening through which the protrusion extends, thus forming the seal 21. The sheet metal part of the armature can thus simultaneously be connected in this area with the retaining element. Preferably, the diameter of the protrusion is slightly larger than the opening in the sheet metal armature or, as can be seen in FIG. 1, it features an undercut. This guarantees a secure retention of the seal section of the mount on the sheet metal armature. In this manner, a shifting of seal section 21 can be avoided. The free end of the protrusion that interfaces with the channel is larger than the cross section of the opening, so it can shut it.

In the production of the sheet metal armature, it is provided that the elastic plastic material of the mount is molded around the sheet metal armature, thus connecting the sheet metal armature with the mount. In this fashion, a robust, mobile sheet metal armature with a seal for the channel can be produced. It is, of course, also possible to connect seal 21 and mount 23 separately with sheet metal armature 14.

Above, a valve has been described that has its own housing. It is also possible that in lieu of the valve housing, the housing of the apparatus itself-into which the valve is installed-has the required mounting devices. In particular, it is possible that the nozzle is part of the housing of the apparatus that retains the ferrite core. In this manner the number of components for the valve itself, and especially the number of moving parts, can be kept very small. The valve can simply be integrated into a housing without a valve housing proper, which permits keeping production effort and cost low. In particular, a valve can be provided that consists only of a housing bottom, an electromagnet, and a sealing element. These parts are held in their positions by the housing cover. In this way the valve is very robust and lightweight, which makes it suitable for use in mobile and portable devices, such as wrist haemo-dynamometers.

What is claimed is:

1. A solenoid valve for the opening and shutting of a channel (16) for a medium, said valve comprising:

an electromagnet (11) with a soft iron magnetic core (12) and a coil (13) and an armature that is actuated by said electromagnet and coil, said channel (16) passing through said soft iron magnetic core;

said armature being configured as a thin sheet metal armature (14) that is elastically retained by a magnetic force generated by said electromagnet and coil, said armature having a seal (21) on a side of said armature facing said channel, and said seal being capable of shutting said channel when said sheet metal armature is pulled down; and said sheet metal armature being retained by at least one mount (23) of elastic plastic material, said elastic mount (23) and said seal (21) being formed as one piece, and said sheet metal armature (14) being at least partially embedded in said elastic plastic material of said mount (23).

2. A solenoid valve according to claim 1, wherein said plastic material is silicone.

3. A solenoid valve according to claim 1, wherein said channel is configured as a nozzle (26) onto which said soft iron magnetic core is stacked and retained.

4. A solenoid valve according to claim 1, wherein said channel is configured as a nozzle (26) onto which said soft iron magnetic core is stacked and retained.

5. A solenoid valve according to claim 3, wherein said nozzle (26) is configured as a protrusion of a housing (22) retaining the valve.

6. A solenoid valve according to claim 4, wherein said nozzle (26) is configured as a protrusion of a housing (22) retaining the valve.

7. A solenoid valve according to claim 3, wherein said nozzle (26) is configured as a protrusion of a housing of an apparatus into which the valve in installed.

8. A solenoid valve according to claim 5, wherein said sheet metal armature (14) is retained in said housing (22).

9. A solenoid valve according to claim 6, wherein said sheet metal armature (14) is retained in said housing (22).

* * * * *